(12) United States Patent
Sundaram et al.

(10) Patent No.: US 10,777,870 B2
(45) Date of Patent: Sep. 15, 2020

(54) SINGLE WIRE COMMUNICATION ARRANGEMENT

(71) Applicant: Intel Corporation, Santa Clara, CA (US)

(72) Inventors: Arvind Sundaram, Bangalore (IN); Ramaswamy Parthasarathy, Bangalore (IN); Vikas Mishra, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 15/440,993

(22) Filed: Feb. 23, 2017

(65) Prior Publication Data

US 2018/0241110 A1    Aug. 23, 2018

(51) Int. Cl.
| | |
|---|---|
| *H01H 47/00* | (2006.01) |
| *H01P 5/08* | (2006.01) |
| *H01P 3/10* | (2006.01) |
| *H01R 13/6477* | (2011.01) |
| *H01R 13/6461* | (2011.01) |

(52) U.S. Cl.
CPC .......... *H01P 5/08* (2013.01); *H01P 3/10* (2013.01); *H01R 13/6477* (2013.01); *H01R 13/6461* (2013.01)

(58) Field of Classification Search
CPC ..... H01P 5/08; H01P 1/24; H01P 3/10; H01R 4/18; H01R 13/24; H01F 7/064
USPC .......................................................... 361/152
See application file for complete search history.

(56) References Cited

U.S. PATENT DOCUMENTS

| | | | |
|---|---|---|---|
| 2,685,068 A | 3/1950 | Goubau | |
| 2,921,277 A | 7/1956 | Goubau | |
| 3,077,569 A | 2/1963 | Kurt | |
| 5,459,635 A * | 10/1995 | Tomozawa | H01G 4/306 |
| | | | 361/311 |
| 5,663,968 A * | 9/1997 | Heuer | G01R 31/30 |
| | | | 714/745 |
| 6,104,107 A | 8/2000 | Avramenko et al. | |
| 6,384,700 B1 | 5/2002 | Craine et al. | |
| 7,009,471 B2 | 3/2006 | Elmore | |
| 7,567,154 B2 | 7/2009 | Elmore | |

(Continued)

OTHER PUBLICATIONS

Non-Final Office Action dated Sep. 27, 2018 for U.S. Appl. No. 15/473,330, 9 pages.

(Continued)

*Primary Examiner* — Jared Fureman
*Assistant Examiner* — Lucy M Thomas
(74) *Attorney, Agent, or Firm* — Schwabe, Williamson & Wyatt, P.C.

(57) ABSTRACT

Embodiments of the present disclosure provide an arrangement for single wire communications (SWC) for an electronic device. In one instance, the arrangement may comprise a cable assembly to connect with the electronic device, wherein the cable assembly may include a wire to conduct SWC and a cover portion to cover a portion of the wire. The cover portion may comprise a ferro-dielectric material. The arrangement may further include a control logic coupled with the cable assembly, to adjust characteristics associated with the ferro-dielectric material, to tune a signal termination impedance value associated with the cable assembly. Other embodiments may be described and/or claimed.

14 Claims, 12 Drawing Sheets

(56) References Cited

U.S. PATENT DOCUMENTS

| | | | | |
|---|---|---|---|---|
| 2005/0095998 A1* | 5/2005 | Toncich | ............ | G01R 27/2694 |
| | | | | 455/129 |
| 2015/0093920 A1* | 4/2015 | Colantuono | ....... | H01R 13/6205 |
| | | | | 439/39 |
| 2018/0198484 A1 | 7/2018 | Bennett et al. | | |

OTHER PUBLICATIONS

Helge Engan, "Waveguide Propagation," NTNU, Jan. 2006, 43 pages.

Glenn Elmore, "Introduction to the Propagating Wave on a Single Conductor," Corridor Systems, Jul. 27, 2009, 30 pages.

Tahsin Akalin et al., "Single-Wire Transmission Lines at Terahertz Frequencies," IEEE Transactions on Microwave Theory and Techniques, vol. 54, No. 6, (Jun. 2006), pp. 2762-2767.

"E-Line", Corridor Systems, Inc. [online], (2010) [retrieved Jun. 28, 2017], retrieved from the Internet: <http://www.corridor.biz/News.html>.

Georg Goubau, "Surface Waves and Their Application to Transmission Lines," Journal of Applied Physics, vol. 21, (Nov. 1950), 11 pages.

Non-Final Office Action dated Apr. 30, 2019 for U.S. Appl. No. 15/440,983, 15 pages.

Notice of Allowance dated Mar. 15, 2019 for U.S. Appl. No. 15/473,330, 11 pages.

\* cited by examiner

SINGLE WIRE COMMUNICATION ARRANGEMENT

FIELD

Embodiments of the present disclosure generally relate to the field of single wire communications and in particular to providing cable arrangements for single wire communications.

BACKGROUND

Currently, conventional transmission lines (TL), comprising high speed links, are widely used to support communications between different devices. Conventional TLs have good properties to support transmission speeds reaching 10 Gbps. For transmission speeds above this, TLs may exhibit excessive losses. To overcome these losses, TLs may be limited to certain bandwidths, and multiple lanes may be used for signal communication. To limit cross talk, differential types of signals may also be used. However, such approach may applicable for lower bandwidths, whereas with higher bandwidths the number of lanes may need to be increased substantially. Furthermore, the losses in the TL may limit the signal travel distance.

Single wire communication (SWC) techniques may present a viable alternative to TLs at high speeds. SWC is a transmission technique that uses a single wire for data transmission, and may not require a return wire. However, for SWC to be a practical alternative to TLs, high coupling efficiency, reduction of cross talk, low cost, and power savings may need to be achieved.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
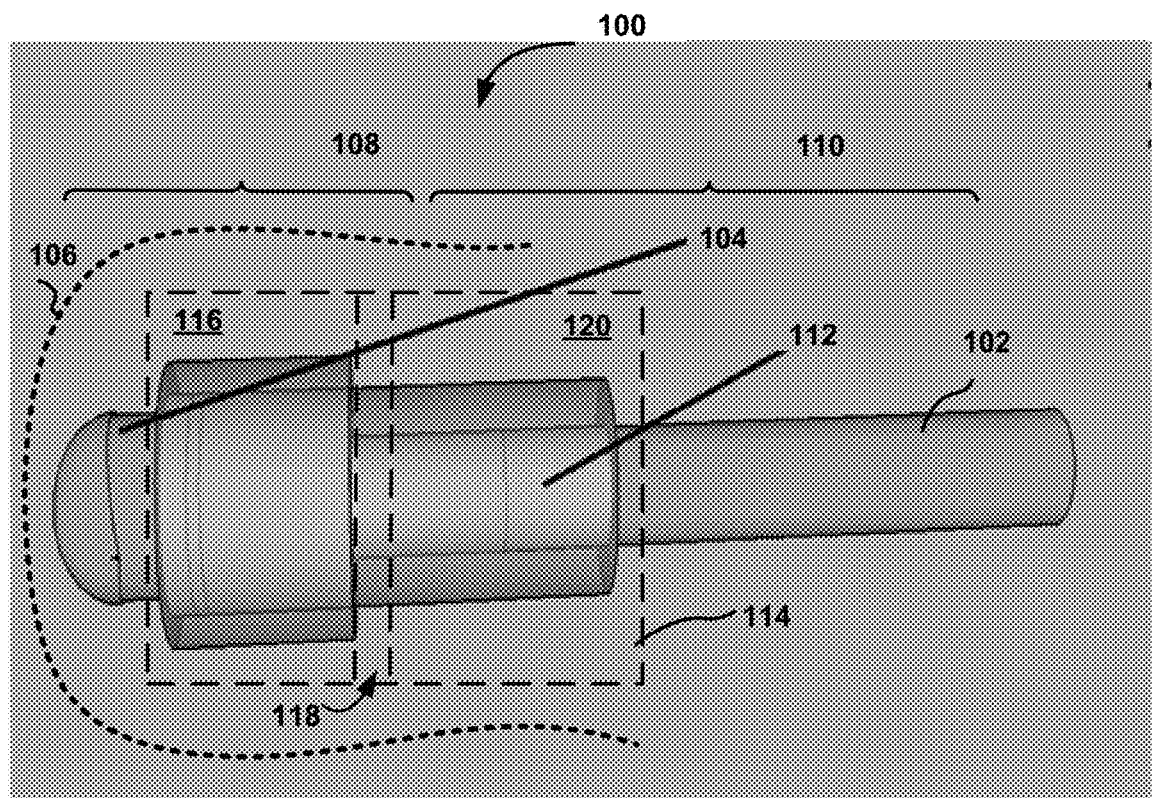
FIGS. 1-3 illustrate various views of an example SWC cable assembly for SWC for an electronic device, in accordance with some embodiments.

Embodiments of the present disclosure include techniques and configurations for an arrangement comprising a cable assembly to provide single wire communications (SWC) for an electronic device. In one instance, the SWC cable assembly may comprise a wire having a wire end to couple with a signal launcher of an electronic device, and a first cover portion to house a first portion of the wire that extends from the wire end. The first cover portion may comprise a shape to conform to a shape of the signal launcher, and may be fabricated of a material with a dielectric constant above a threshold. In embodiments, the material of the first cover portion may comprise a ferro-dielectric material, such as perovskite material.

The assembly may further comprise a second cover portion coupled with the first cover portion to house a second portion of the wire that extends from the first wire portion and protrudes from the first cover portion. The second cover portion may be fabricated of a ferrite material.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Single wire communications (SWC) may employ signal launchers embedded in an electronic device for SWC signal transmission. A signal launcher may comprise a conical shape (or otherwise shaped) structure ("horn") to excite the surface wave mode (transverse electromagnetic mode, or TEM) onto an insulated single conductor transmission line (wire). With the horn placed along with the wire, the coupling of the TEM may increase dramatically, thereby increasing the efficiency of the coupling. Because of the high coupling, adjacent conductors (transmission lines) may also get affected due to cross talk. For example, a high speed cable may include multiple links, and having interference (cross talk) between adjacent links of the high speed cable may be detrimental for quality of communications.

As the signal exits the launcher, for a distance determined by the frequency and construction, a heavy radio frequency (RF) isolation may be desired, to prevent the TEM wave from influencing or getting influenced by the neighboring SWC cable. Within the horn of a signal launcher, a very high coupling may be needed, which may be provided by forming a high capacitive material around the conductor inside the signal launcher.

The embodiments of the SWC cable assembly described herein provide for high capacitive coupling within the horn of a signal launcher, high inductive rejection between the cable and the external entities, and lower cost for the cable assembly. Further, the SWC cable assembly embodiments described herein provide for robust structure, allowing for frequent makes and breaks of connection between the SWC cable assembly and a signal launcher of an electronic device.

Figure 2:
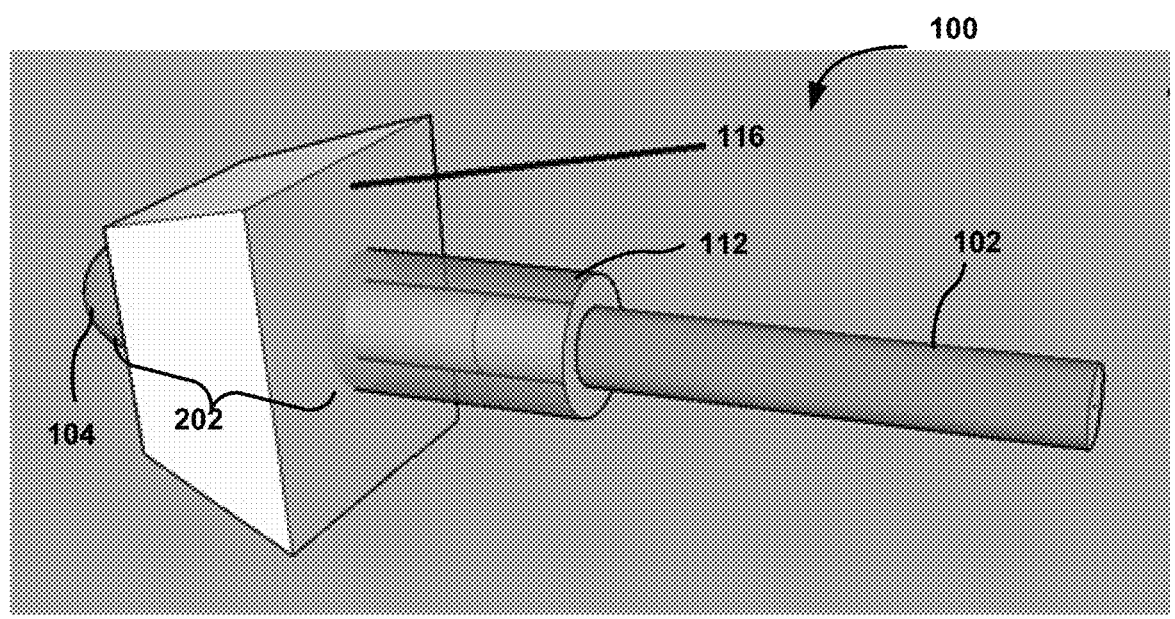
Figure 3:
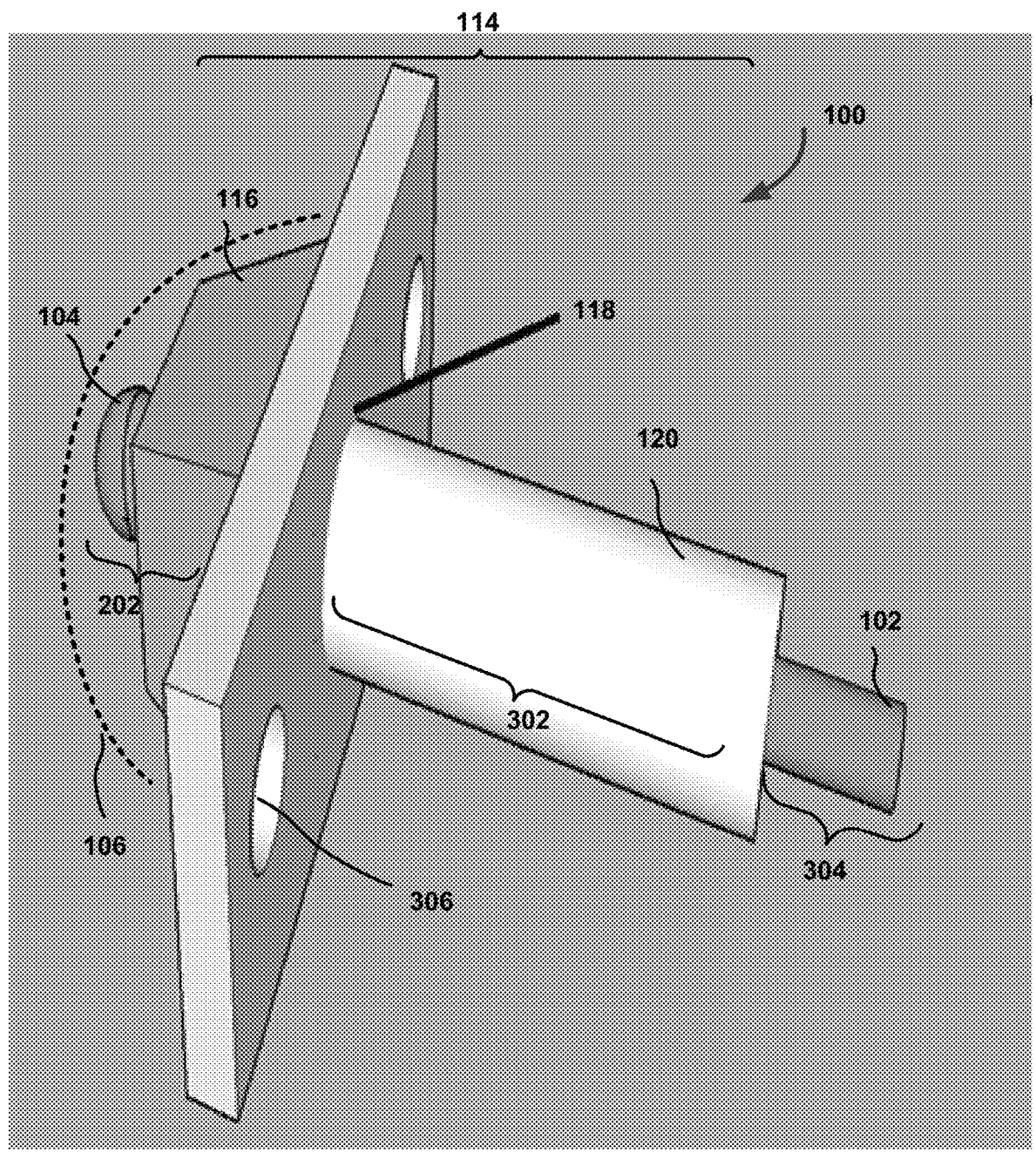

FIGS. 1-3 illustrate various views of an example SWC cable assembly for SWC for an electronic device, in accordance with some embodiments. For ease of understanding, the like components of FIGS. 1-3 are indicated by like numerals.

FIG. 1 is a side view of an example SWC cable assembly 100 in a partially assembled state, in accordance with some embodiments. The cable assembly 100 may include a wire 102 with a wire end 104, to couple with a signal launcher 106 of an electronic device (not shown), schematically illustrated by a dotted line. The wire 102 may comprise a size to carry sufficient direct current, because SWC using the cable assembly 100 may be used for both power transfer and data transmission. In embodiments, the wire 102 may comprise a copper wire.

As shown, the portion 108 of the cable assembly 100 may be insertable into, and/or removable from, the signal launcher 106. The portion 110 of the cable assembly 100 may comprise a portion of the wire 102 to carry a signal or power to a receiving end of the cable assembly 100 (not shown).

The wire connection to the middle of the horn of the signal launcher 106 may be forced to contact the horn, and such may be spring loaded for better contact resistance. Accordingly, a portion the wire 102 extending from the wire end 104 may be housed by a cover portion, or a housing 112, such as a pogo pin. For ease of understanding, the housing 112 is shown in FIG. 1 in a transparent state. For example, the wire 102 may be crimped to an end of the housing (pogo pin) 112.

In some embodiments, the cable assembly may include a cover 114, schematically shown in FIG. 2 in dashed lines, to house a portion of the wire 102 with the housing 112. As shown, the wire end 104 may protrude from the cover 114.

The cover 114 may provide for reduction of cross talk and robust structure of the cable assembly 100. In embodiments, the cover 114 may comprise cover portions 116, 118, and 120, coupled together as shown. The cover 114 comprising portions 116, 118, and 120 will be described in greater detail in reference to FIGS. 2-3.

FIG. 2 is a perspective view of an example SWC cable assembly 100 in a partially assembled state, in accordance with some embodiments. More specifically, FIG. 2 illustrates the SWC cable assembly 100 with the cover portion 116 of the cover 114. As shown, the cover portion 116 may house a portion 202 of the wire 102 (with a corresponding portion of the housing 112). As shown, the wire portion 202 covered by the cover portion 116 may extend from the wire end 102, which may protrude from cover portion 116, to provide for a contact with the signal launcher (not shown in FIG. 2). As shown, the cover portion 116 comprises a shape to conform to a shape of the signal launcher, with which the cover portion 116 may be coupled (e.g., inserted into). Accordingly, a length of the cover portion 116 may corresponds to a length of a horn of the signal launcher.

In order to provide for capacitive coupling with a grounded surface of the horn of the signal launcher, the cover portion 116 may be fabricated of a ferro-dielectric material with a dielectric constant above a particular threshold, in order to provide for capacitive coupling (isolation). For example, the cover portion may be fabricated from an inorganic compound, such as a barium titanate ($BaTiO_3$) or barium titanate oxide $BaSrTiO2$ or other perovskite material. In embodiments, the cover portion 116 may be fabricated by a micro particle injection moulding process (PIM). A size of micro particles may comprise a range from about 1 um to 10 um. For example, the die may have a horn structure covering the housing (pogo pin) 112 with the riser injected with the barium titanate ceramic suspension. A die may be a mold or a tool that is used to shape material. A riser may be a part of the die or mold and may act as a conduit through which the ceramic suspension is conveyed into the mold.

FIG. 3 is a perspective view of an example SWC cable assembly 100 in an assembled state, in accordance with some embodiments. As shown, the cover portion 120 of the cover 114 may be coupled with the cover portion 116 and may house a portion of the wire 302 (and corresponding portion of the housing 112). The wire portion 302 may extend from the wire portion 202 and protrude from the cover portion 120. As shown, the cover portion 120 may comprise the portion 110 of the cable assembly 100 and may be disposed outside the signal launcher 106 in response to coupling of the cable assembly 100 with the signal launcher 106. The portion 110 of the cable assembly 100 including the cover portion 120 may be susceptible to interference, due to high efficacy of the signal launcher 106 or another signal launcher (not shown) disposed in the electronic device in proximity to the cable assembly 100. The cover portion 120 may comprise a length that may correspond to a strength and swing of the signal launcher 106. Swing of the signal refers to voltage change at the output of the driver. As speed of the signal increases, to achieve the same voltage swing at the output requires high amount of current that can be turned on or off. Higher current drive may cause the voltage output to rise or fall faster. But with higher current the coupling with neighboring wires may also increase as the field strength increases with rapid change of current. This strong signal needs to be shielded so neighboring wires do not get disturbed.

To prevent coupling to and from the neighboring cable assembly or communication link, a high density ferrite overmoulding may be required. Accordingly, the cover portion 120 may be fabricated of a ferrite material, which may act as a floating ground field isolator. For example, a particle size of the ferrite material may be in a range from about 30 nm to about 1 um. For example, the ferrite material may comprise a nickel and zinc (NiZn) ferrite provided in a suspension. The suspension may be injected into the mold covering the wire 102. Mold (or die) is a tool which is used to give shape to the material. In this case the material is the ferrite paste. It may also be a ceramic composite material depending on where it is being used on the cable structure. It may be molded into shape using the mold. The final outcome may be the molded ferrite wrapping over the wire cover that may act like a shield.

In embodiments, the cover 114 may include the cover portion 118, which may be disposed between the cover portions 116 and 120. The cover portion 118 may comprise a mounting plate to mount the cable assembly 100 to an electronic device (e.g., a printed circuit board (PCB)), and include one or more mounting components 306 (e.g., pads, apertures, or the like). In embodiments, the cover portions 116, 118, and 120 may be sintered together. In embodiments, the strength of the resultant sintered cover 114 may yield high strength overmoulding for the cable assembly 100. With a very high density of the final molded part, the strength of the resultant sintered cover 114 may approach that of the parent material. If the ceramic to binder ratio is high, as in the ceramic is close to 100%, the density of the final mold may be close to that of the ceramic material.

The cable assembly 100 with the cover 114 as described above may provide for desired mechanical robustness to ensure repeated coupling with and de-coupling from the signal launcher 106. Further, coupling and isolation characteristics of the SWC cable assembly 100 may provide for efficient (with a low loss) power and data transmission, and provide low assembly cost. As the cable coupling diminishes with an increase of the distance from the signal launcher, the portion 304 of the wire 102 (bare copper wire) that extends from the wire portion 302 and protrudes from the cover portion 120 may be covered by polyvinyl chloride (PVC) sheath, similar to a conventional cable.

In embodiments, the SWC cable assembly 100 may provide for power and data communications for different electronic devices and/or compute environments. For example, the SWC cable assembly may be used in a multi-die environment (e.g., multi-chip module (MCM)). In another example, the SWC cable assembly 100 may provide for SWC between a central processing unit (CPU) and other devices of a computing system (e.g., in a motherboard). In yet another example, the SWC cable assembly 100 may provide for communications between different compute components, such as in a data center environment, for example. In embodiments, the SWC cable assembly 100 may be used to couple with a printed circuit board (PCB).

Figure 4:
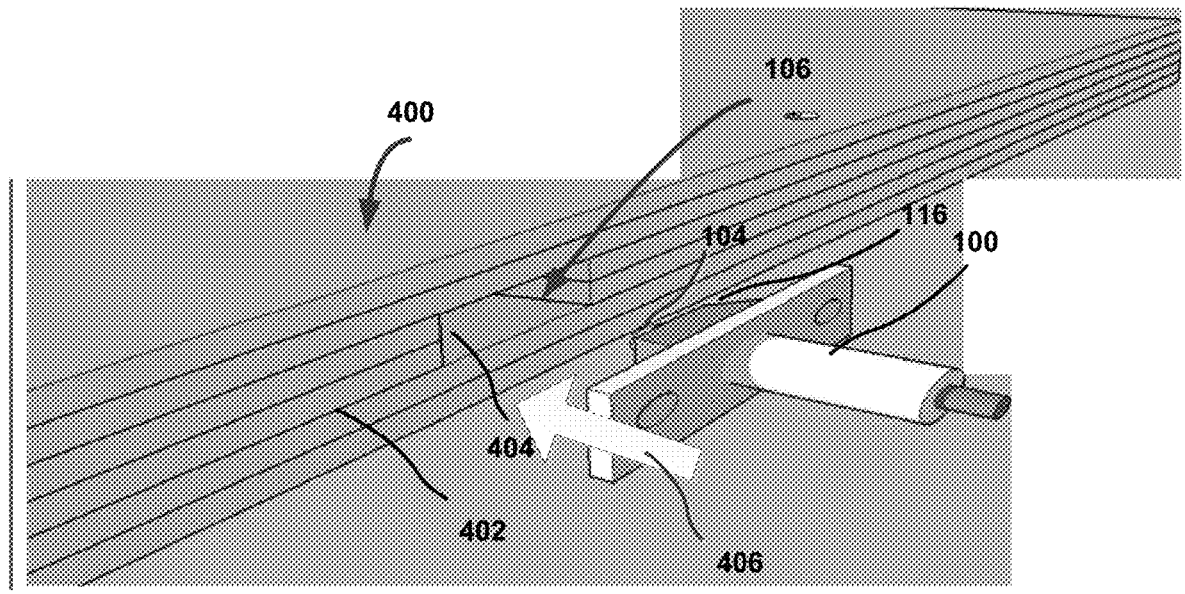
FIGS. 4-5 illustrate example coupling of the SWC cable assembly of FIGS. 1-3 to an electronic device, in accordance with some embodiments.
Figure 5:
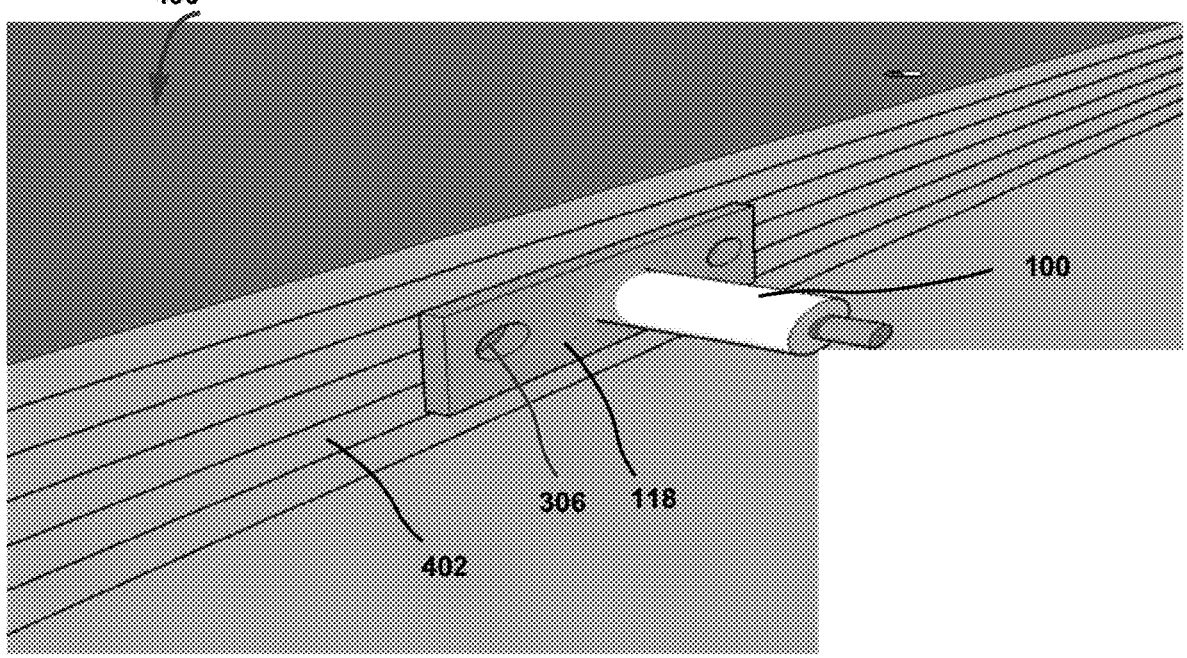

FIGS. 4-5 illustrate example coupling of the SWC cable assembly of FIGS. 1-3 to an electronic device, in accordance with some embodiments. In embodiments, the electronic device may comprise a PCB 400. As shown in FIG. 4, the signal launcher 106 of the PCB 400 may be disposed on a side 402 of the PCB 400, and comprise a horn 404. At least the portion 116 with the wire end 104 of the SWC cable assembly 100 may be coupled with the horn 404, (in response to insertion of the cable assembly into the signal launcher 106, as indicated by arrow 406.

As shown in FIG. 5, the SWC cable assembly 100 may be attached to the side 402 of the PCB 400 with the cover portion (mounting pad) 118, using the mounting components 306.

Figure 6:
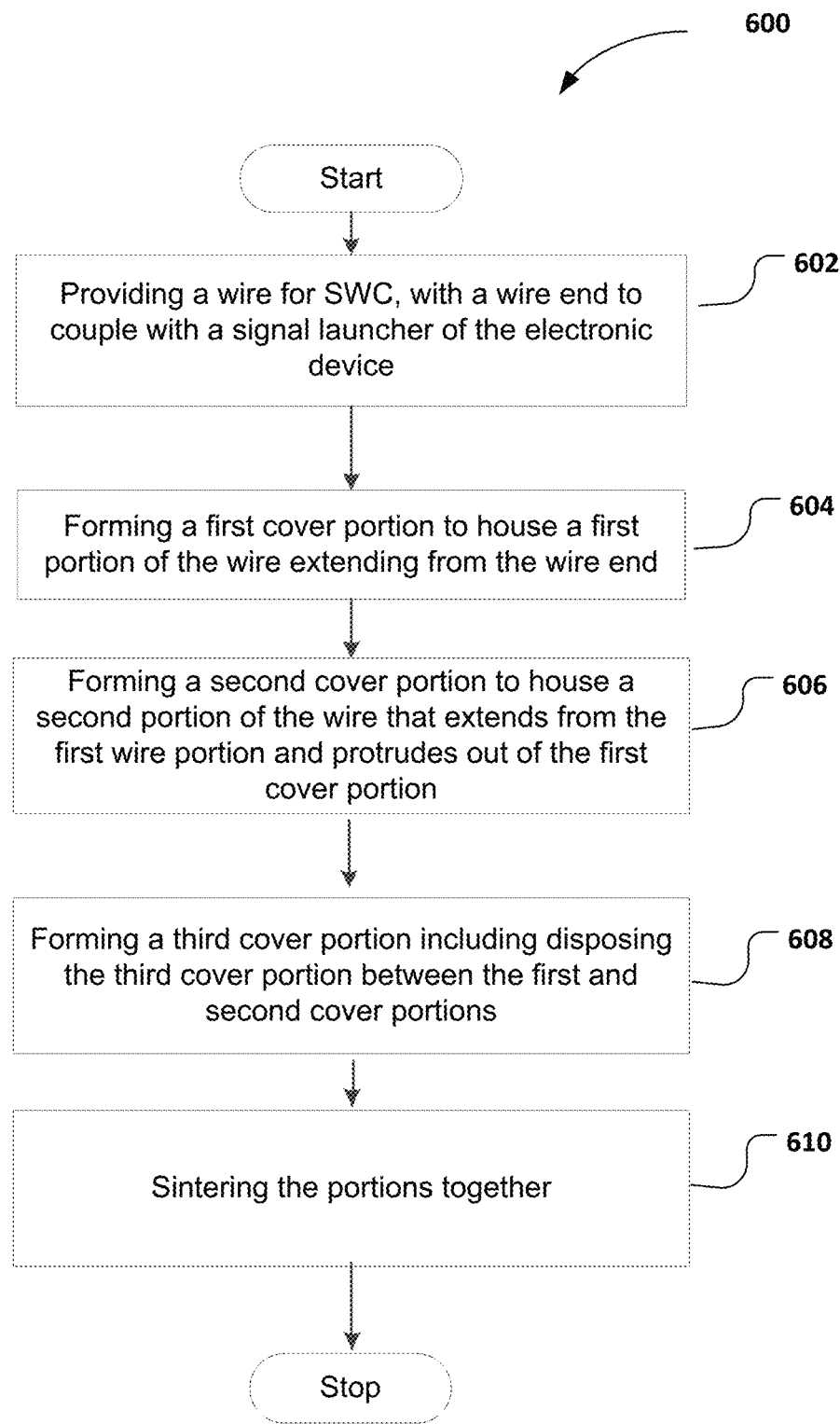
FIG. 6 is an example process flow for fabricating an SWC cable assembly providing SWC for an electronic device, in accordance with some embodiments.

FIG. 6 is an example process flow for fabricating an SWC cable assembly providing SWC for an electronic device, in accordance with some embodiments. The process 600 may comport with embodiments described in reference to FIGS. 1-5. It will be understood that at least some of the actions described in reference to different process blocks may be completed in a different order or substantially simultaneously.

The process 600 may begin at block 602 and include providing a wire for SWC, with a wire end to couple with a signal launcher of the electronic device.

At block 604, the process 600 may include forming a first cover portion (e.g., 116) of a cover of the cable assembly to house a first portion of the wire (e.g., 202) extending from the wire end. As described above, the first cover portion may comprise a material with a dielectric constant above the threshold. Forming the first cover portion may include shaping the first cover portion to conform to a shape of the signal launcher of the electronic device, and fabricating the first cover portion by a micro particle injection moulding process.

At block 606, the process 600 may include forming a second cover portion (e.g., 120) to house a second portion of the wire (e.g., 302) that extends from the first wire portion and protrudes out of the first cover portion. Forming the second cover portion may include fabricating the cover portion of a ferrite material using a high density ferrite overmoulding process.

At block 608, the process 600 may include forming a third cover portion, including disposing the third cover portion between the first and second cover portions. As described, the third cover portion may comprise a mounting plate to attach the SWC cable assembly to the electronic device.

At block 610, the process 600 may include sintering the first, second, and third portions together, to provide the cover for the SWC cable assembly 100.

Figure 7:
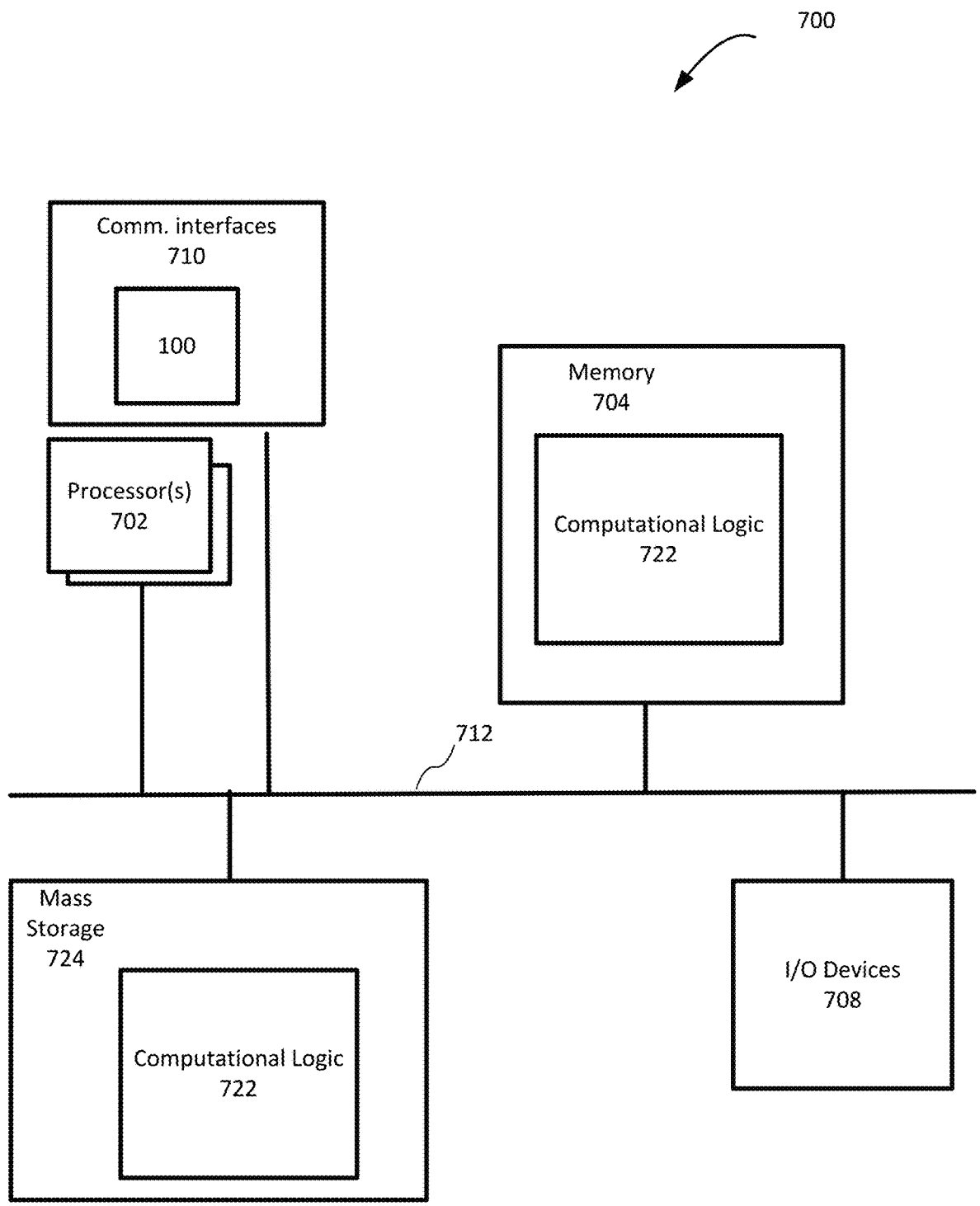
FIG. 7 illustrates an example computing device suitable for use with the SWC cable assembly of FIGS. 1-3, in accordance with some embodiments.

FIG. 7 illustrates an example computing device 700 suitable for use with the SWC cable assembly of FIGS. 1-3, in accordance with some embodiments. In some embodiments, example computing device 700 may include various components described in reference to FIGS. 1-3, such as the SWC cable assembly 100.

As shown, computing device 700 may include one or more processors or processor cores 702 and system memory 704. For the purpose of this application, including the claims, the terms "processor" and "processor cores" may be considered synonymous, unless the context clearly requires otherwise. The processor 702 may include any type of processors, such as a central processing unit (CPU), a microprocessor, and the like. The processor 702 may be implemented as an integrated circuit having multi-cores, e.g., a multi-core microprocessor.

The computing device 700 may include mass storage devices 724 (such as solid state drives, volatile memory (e.g., dynamic random-access memory (DRAM), and so forth)). In general, system memory 704 and/or mass storage devices 724 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 700 may further include input/output (I/O) devices 708 (such as display, soft keyboard, touch sensitive screen, image capture device, and so forth) and communication interfaces 710 (such as network interface cards, modems, infrared receivers, radio receivers (e.g., Near Field Communication (NFC), Bluetooth, WiFi, 4G/5G Long Term Evolution (LTE), and so forth)).

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

In some embodiments, the communication interfaces 710 may comprise the SWC cable assembly 100 of FIGS. 1-3. The SWC cable assembly 100 may be provided, for example, to enable communications between the processors 702 and other components of the computing device 700 or another (e.g., external) apparatus (not shown), via the I/O devices 708.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 724 may be employed to store a working copy and a permanent copy of the programming instructions implementing firmware, an operating system and/or one or more applications to be executed on the computing device 700. Some of the firmware may configure, control and/or operate the integrated circuits associated with the SWC cable assembly described in reference to FIGS. 1-3, collectively denoted as computational logic 722. Computational logic 722 may be implemented in assembler instructions supported by processor(s) 702 or high-level languages that may be compiled into such instructions.

The number, capability, and/or capacity of the elements 708, 710, 712 may vary, depending on whether computing device 700 is used as a mobile computing device, such as a tablet computing device, laptop computer, game console, or smartphone, or a stationary computing device, such as a set-top box, a desktop computer or a server. Their constitutions are otherwise known, and accordingly will not be further described.

At least one of processors 702 may be packaged together with memory having computational logic 722 to form a System in Package (SiP) or a System on Chip (SoC). In various implementations, the computing device 700 may comprise a mobile computing device, such as a smartphone, a tablet, a personal digital assistant (PDA), an ultra mobile PC, or any other mobile computing device. In various embodiments, the computing device may comprise a laptop, a netbook, or a notebook. In further implementations, the computing device 700 may be any other electronic device that processes data.

As described above, the signal exits the signal launcher of an SWC cable assembly (e.g., 100), for a distance determined by the frequency and construction, an RF isolation may be desired. To aid in better coupling of the SWC cable assembly to a PCB, the termination requirements for SWC may be very particular. For example, the impedance of the line may need to be tunable from 25 Ohm to 400 Ohm. Impedance may be selected based on a variety of parameters including bit error rates, which may be calculated at the time of tuning or setup of the interface between the SWC cable assembly and the PCB. Accordingly, the termination may need to be tunable, to provide very low loss at termination, especially at high frequencies of the signal transmission.

Figure 8:
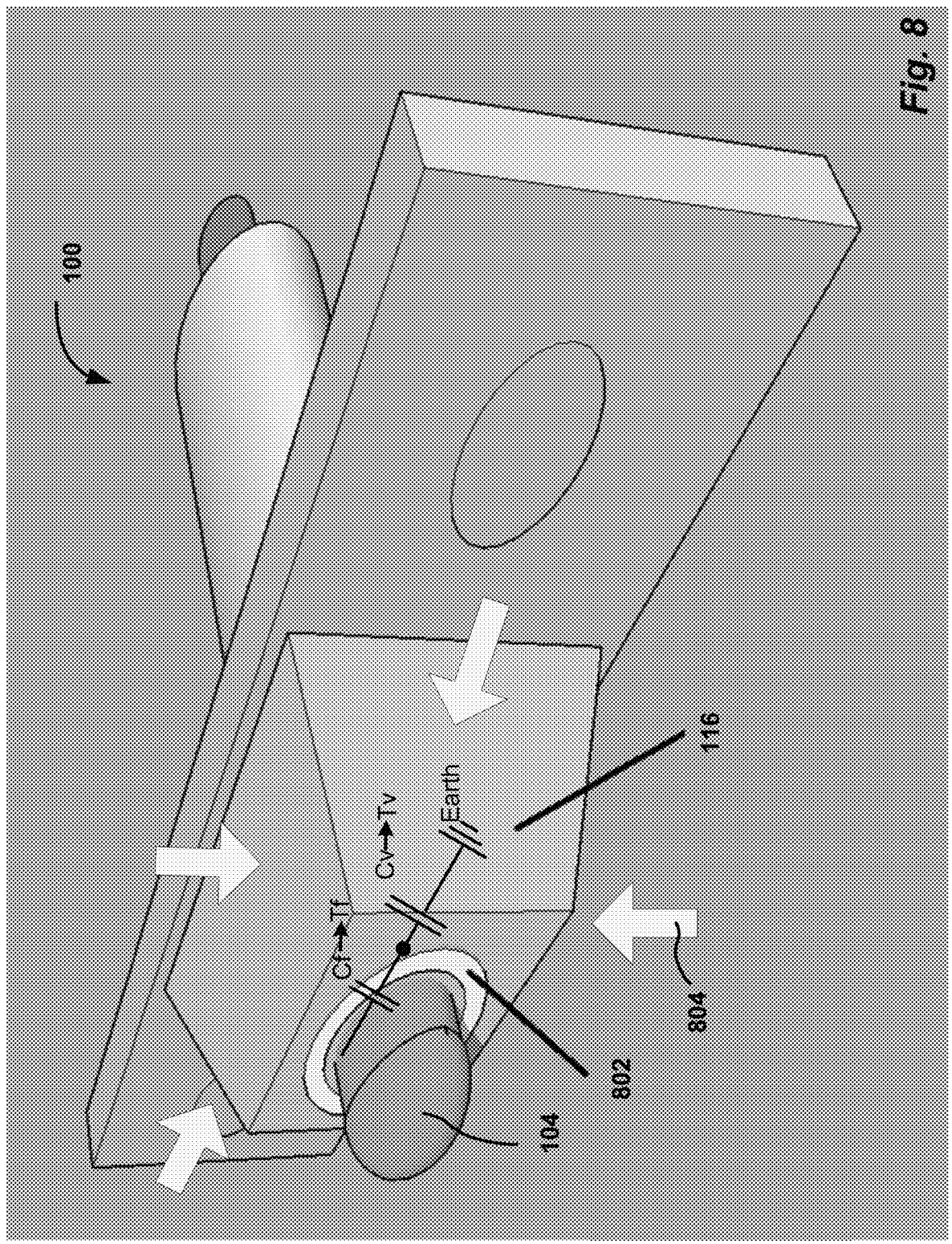
FIG. 8 is another perspective view of an example SWC cable assembly in an assembled state, in accordance with some embodiments.

FIG. 8 is another perspective view of an example SWC cable assembly 100 in an assembled state, in accordance with some embodiments. As shown, an air gap may occur between an end of the pogo pin 112 and moulding comprising the cover portion 116. This air gap may act as a fixed capacitance (Cf). Cf may vary due to external influences in a negligible manner, and such variations may be disregarded.

Overmoulding of the cover portion 116 may comprise a perovskite compound, such as barium strontium titanate, which may exhibit ferro-para-electric capacitive properties. When the SWC cable assembly 100 is inserted into a signal launcher, the overmoulding may be covered by the grounded shield of the launcher, which is referred to as "earth" in FIG. 8. The perovskite material of the overmoulding of the cover portion 116 between the air gap and the earth may have ferro-electric property-induced variable capacitance. The capacitance formed by the cover portion 116 may be indicated Cv.

Figure 12:
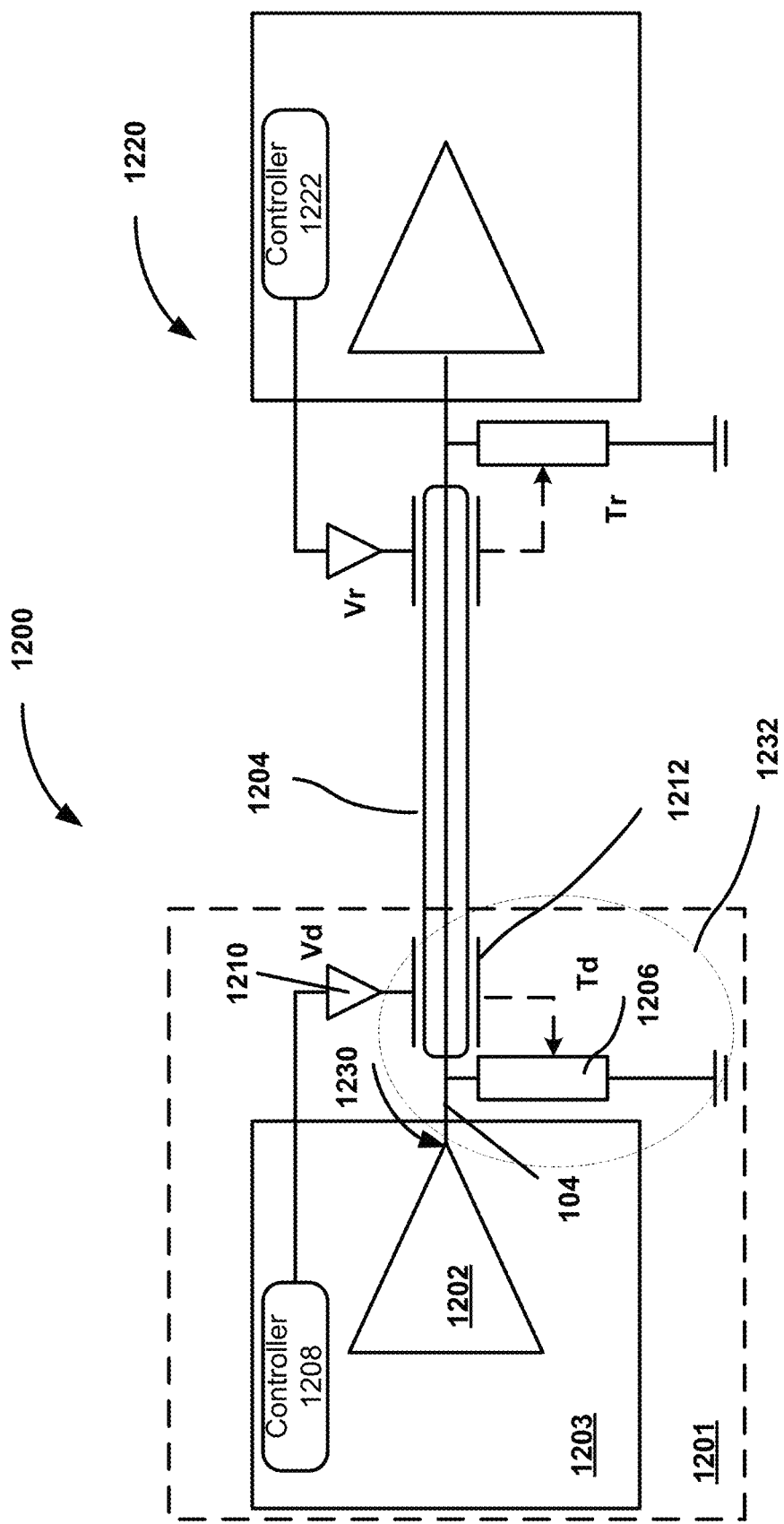
FIG. 12 is an example diagram illustrating an SWC arrangement providing a unidirectional signal transmission, with termination control logic, in accordance with some embodiments.

Signal termination impedance of the SWC cable assembly 100 may be described as a function of fixed capacitance Cf, and variable capacitance Cv, connected in series to ground as shown in FIG. 8. Termination impedance may be indicated by Tf and Tv, and comprise impedances as seen by a signal when it passes through capacitances Cf and Cv respectively. For example, $Tf=\frac{1}{2}*Pi*F*Cf$, wherein Pi is constant, and F is the equivalent frequency of the high speed signal. Similarly, $Tv=\frac{1}{2}*Pi*F*Cv$. The total termination at the device side Td (as shown in FIG. 12 below) may be represented as Td=Tf+Tv. Because Tv varies with Cv, which in turn varies with the magnetic field (flux) 804, Td also may vary accordingly.

Figure 9:
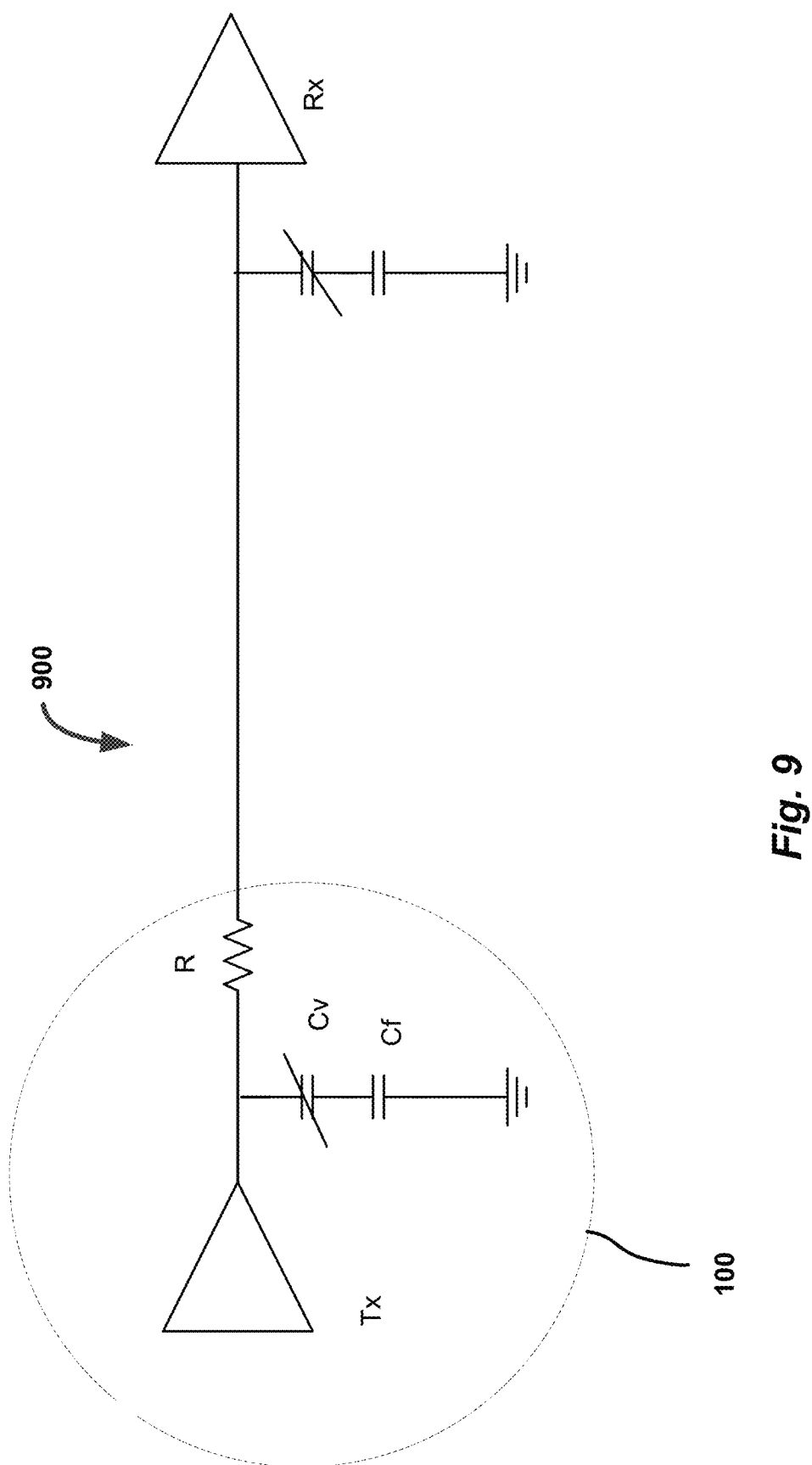
FIG. 9 is an example schematic electrical diagram of an SWC cable assembly, in accordance with some embodiments.

FIG. 9 is an example schematic electrical diagram of an SWC cable assembly, in accordance with some embodiments. The portion indicated by the dashed line may represent the SWC cable assembly 100. As shown, the device 900 includes a transmission side Tx (which may comprise the SWC cable assembly 100) and reception side Rx (which may comprise another SWC cable assembly similar to 100). The impedance R may comprise characteristic impedance pertaining to the SWC cable assembly 100, such as wire 102 (FIG. 1).

Capacitance Cf may be fixed capacitance of the SWC cable assembly 100 (e.g., defined by an air gap 802 as described above). Capacitance Cv may be a tunable structural capacitance pertaining to the portion 106 of the cable assembly 100, as described above. The tunable capacitance Cv may be formed as part of the cable assembly. As shown in FIG. 9, Cv and Cf may be described as connected in series. (For ease of understanding, Cv and Cf are also schematically shown in FIG. 8.) Tuning Cv may result in a corresponding change of the termination impedance of the transmission line of the device 900. Accordingly, the termination may be tuned to improve coupling of the TEM. Tunable termination may provide for maintenance of very high levels of coupling and maintenance of data and signal integrity. The embodiments described herein provide example tuning techniques, which may include electrically tunable capacitance and thereby tunable termination, using ferro-dielectric materials (e.g., perovskite) in the SWC cable assembly.

Ferro-dielectrics may be materials whose dielectric properties may be modified by exposure to an external electric or magnetic (or a combination of both) field. Perovskites are a class of material with a certain atomic structure. Practically every element in the periodic table may be placed within the lattice and every compound that comes out of the composition may have certain unique properties. The examples of the ferro-dielectric (perovskite) materials to be used in the SWC cable assembly may include perovskite materials with barium or strontium additives, such as, for example, BaSr-TiO2. In some embodiments, Cv may be tuned using an external electrical field that may change the capacitance of the tunable structure (e.g., cover portion 116 comprising a perovskite structure). Ferro-dielectric (e.g., perovskite) overmoulding of the cover portion 116 may be exposed to electric field, indicated by arrows 804 in FIG. 8. Under the varying electric field, capacitance Cv may be modified, based on electric field applied to the cover portion 116. In other words, the electric field applied to the cover portion 116 (perovskite structure) may be modified, to change capacitance Cv, and correspondingly obtain a desired termination impedance.

The termination of SWC channel may depend on various physical structures employed, manufacturing variations, wear and tear, aging related creep, environmental conditions, stray fields and the materials physical properties. Typically, an SWC channel may have a termination of 300 or more Ohms. Most of the signaling schemes used for SWC excitation may be in the range of 25-100 ohms. As described above, termination impedance may be a function of fixed capacitance Cf, and variable capacitance Cv, connected in series to ground.

Figure 10:
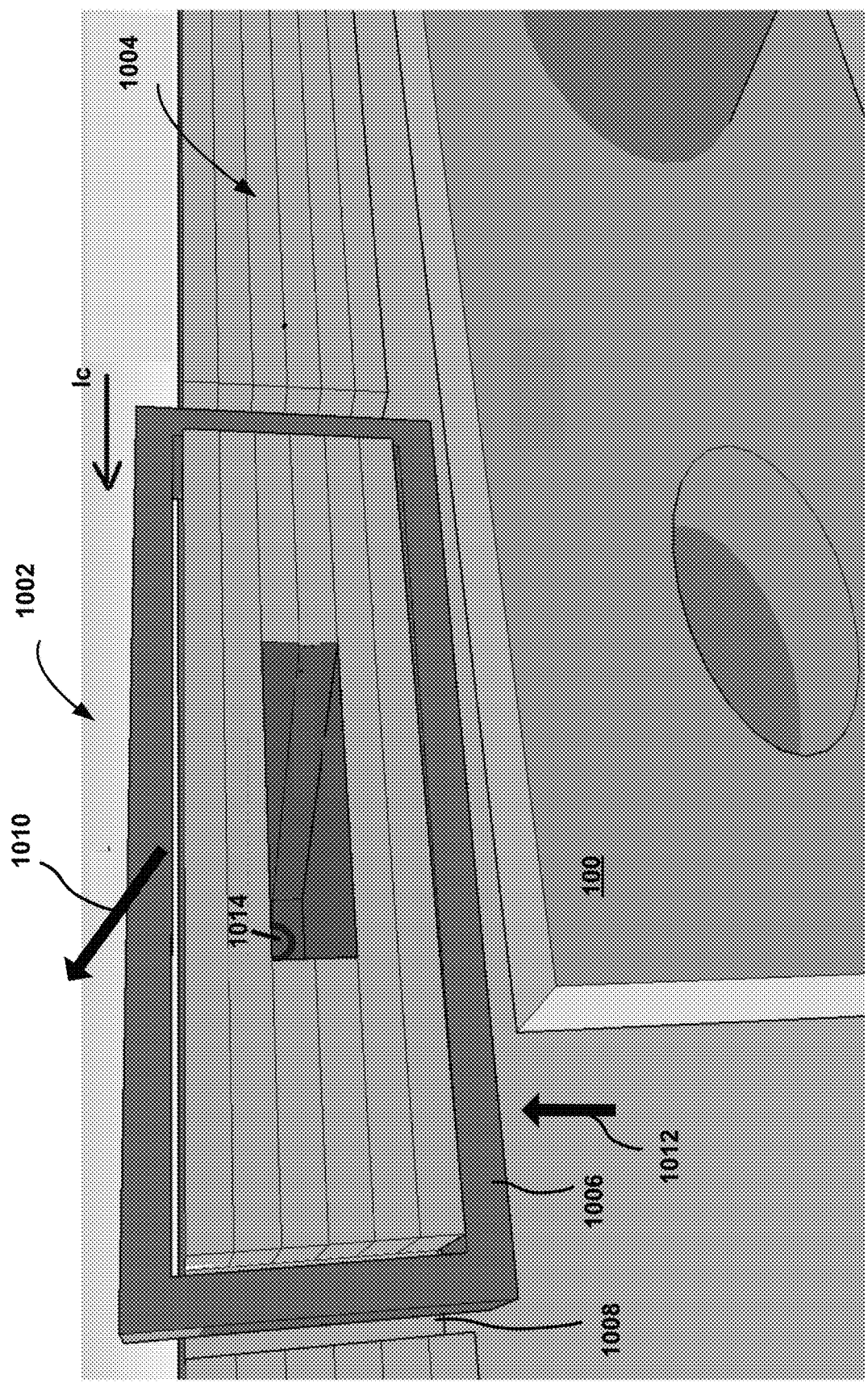
FIG. 10 is an example coupling of an SWC cable assembly to an electronic device, such as a PCB, in accordance with some embodiments.

FIG. 10 illustrates an example coupling of an SWC cable assembly to an electronic device, such as a PCB, in accordance with some embodiments. In the illustrated embodiment, a side 1004 of a PCB 1002, to which the SWC cable assembly 100 may be attached, may include a magnetic coil 1006. As shown, in some embodiments, the PCB side 1004 may comprise a recess 1008, in which the magnetic coil 1006 may be disposed. Electric current Ic through the coil 1006 may produce a magnetic field 1010 that may be sufficient to hold the SWC cable assembly 100 in place, when attached to the PCB side 1004. Such attachment may be possible due to ferrite overmoulding over the SWC cable (e.g., portion 116 of the SWC cable assembly 100 shown in FIGS. 1 and 8).

The current Ic through the coil 1006 may also produce an electric field 1012, which may cause changes to the capacitance Cv of the overmoulding, as described above. The capacitance Cv of the overmoulding may be changed (tuned) in such a way that the termination may assure perfect coupling of the SWC cable assembly 100 with a signal launcher 1014. At the same time, the magnetic field 1010 produced by the coil 1006 may assist in holding the SWC cable assembly 100 in place, e.g., attached to the PCB 1002.

The advantages of the described embodiments are that the current Ic used for latching the SWC cable assembly 100 to the PCB 1002 may also be used to tune the termination of the cable of the SWC cable assembly 100. In summary, the coupling of the SWC cable assembly 100 to the mating portion (side 1004) of the PCB 1002 may be provided in such a way that both generated fields may be put to use: the magnetic field 1010 may be used to hold the cable tethered to the PCB, and the electric field 1012 may be used to tune capacitance Cv, to provide desired termination.

Figure 11:
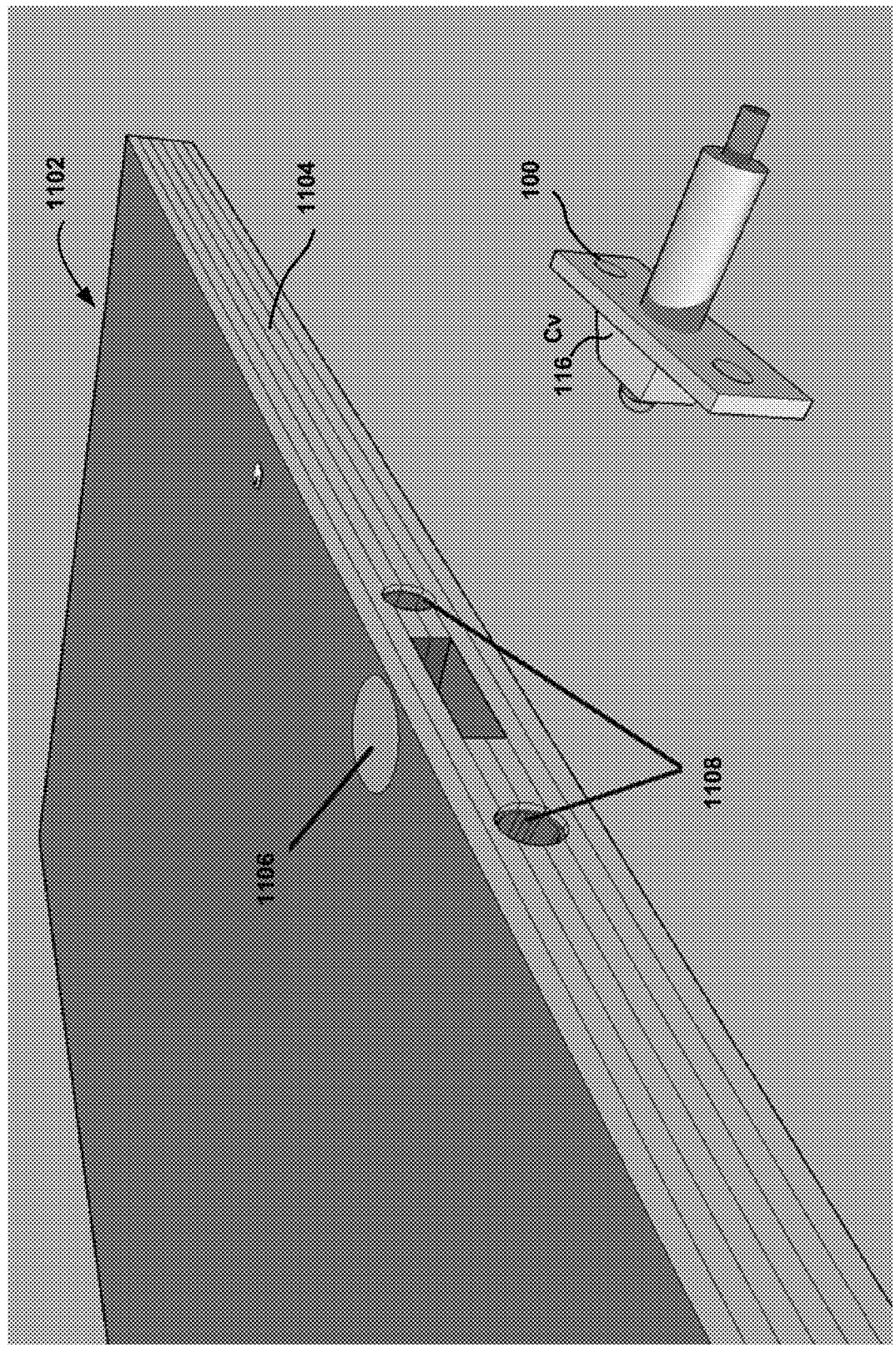
FIG. 11 is another example coupling of an SWC cable assembly to an electronic device, such as a PCB, in accordance with some embodiments.

FIG. 11 illustrates another example coupling of an SWC cable assembly to an electronic device, such as a PCB, in accordance with some embodiments. In the illustrated embodiment, an electric field may be used to tune capacitance Cv (or dielectric constant) of the SWC cable assembly 100. As shown, a PCB 1102 may include a plate 1106 disposed, e.g., on a surface of the PCB 1102. The plate 1106 may comprise a conductive material, such as, for example, copper. The plate 1106 may be connected to an electrical circuit (not shown) disposed in the PCB 1102 and configured to generate an electric field, which may be used to tune capacitance Cv associated with the cover portion 116 of the SWC cable assembly 100. The mounting apertures 1108 are shown on a side 1104 of the PCB 1102. These apertures may be used for insertion and holding of the SWC cable assembly 100 into the side 1104 of the PCB 1102. The mounting apertures 1108 are provided for purposes of illustration only and are do not limit this disclosure. Alternative attachment arrangements may include chassis-mounted cable holds, ties, or threaded screws.

FIG. 12 is an example diagram illustrating an SWC arrangement providing a unidirectional signal transmission, with termination control logic, in accordance with some embodiments. As shown, the arrangement 1200 may include a driver side 1201, having a signal driver 1202 coupled to an SWC line 1204. In some embodiments, the signal driver 1202 and controller 1208 may be integrated on a system on chip (SoC), schematically indicated by module 1203. For purposed of explanation, the pogo pin 104 is indicated in FIG. 12. The impedance Td 1206 may represent termination at the driver side 1201. In other words, 1206 is a notional representation of termination resistance, shown in FIG. 12 for purposes of explanation.

Similarly, Tr may represent termination at a receiver side 1220. As described above, the impedance Td 1206 may be formed between the pogo pin 104, air gap 802, and the cover portion 116 (referencing FIGS. 1 and 8). The portion 1232 of the diagram indicates the SWC cable termination shown in FIG. 8. The arrangement 1200 may further include control logic to control termination, in some embodiments. The control logic may include a controller 1208 coupled with the SWC line 1204 via a driver component (diode) 1210. The controller 1208 may be independent and may control the driver side termination. As shown, the receiver side 1220 may include a controller 1222, similar to the arrangement on the drive side. The controllers 1208, 1222 may be digital to analog (DAC) controllers or similar devices configured to output different voltages based on different input values.

The driver component 1210 may be coupled with termination plates 1212 configured to generate electric field. As discussed in reference to FIG. 10, in some embodiments, the termination plates may be replaced with a coil, so that the voltage applied to the coil may result in the creation of both magnetic field (to hold the connector) and the electric field (to tune Cv). The connection 1230 between the signal driver 1202 and the line 1204 may comprise the SWC cable assembly 100 described above. As described above, for optimal operation, at the time of transmit, the driver side 1201 termination may comprise a certain value, e.g., ranging from about 30 Ohm to about 150 Ohm. Similarly at the receiver side 1220, the termination may need to be tuned to a different value. The tuning may ensure that optimal coupling happens and at the same time prevents excessive charge dumps and overshoots.

In operation, the output voltage from the controller 1208 may pass through a line driver component 1210, which may generate a potential Vd across the termination plates 1212. Similar operation may commence on the receiver side 1220, namely voltage Vr may be generated. The amount of potential at the termination plates 1212 may determine the electric field generated across the respective termination plates (terminals). The magnetic field (flux) 804 may be formed when a potential Vd generated by is applied to terminal plates 1212.

The voltage applied to the terminal plates may create an electric field across the plates, to control and adjust the termination. Accordingly, at the driver side 1201, a fixed voltage Vd may be generated based on previously determined values for the structure, and provide for an equivalent termination value due to the perovskite structure of the SWC cable assembly portion 116.

As known, perovskite materials may have very wide dielectric constants and the composite that is chosen may be different. Also, manufacturing tolerances make this very wide a range to be compensated on a general basis. Accordingly, the tuning procedure may begin with a "best guess" termination value. Based on the settling time (which is determined by the bit errors) the termination value may be adjusted by increasing or decreasing impedance. The best performance of the SWC channel may then be judged, e.g., based on the termination that may provide the least bit errors. In other words, if the bit errors parameter, for a particular termination value, in a signal transmission over SWC cable is above a desired threshold, a tuning of the link may be desired. The tuning may be provided by manipulating the Vd value and checking the corresponding bit errors value. If the bit errors parameter is within the desired range or threshold, the link may be considered tuned, with particular Vd and corresponding Td values.

The generated voltage to adjust termination may be around 15-20V. This voltage (fed by a DAC and an amplifier if needed) may be increased or decreased. For example, the effective voltages for BaSrTiO2 composite for tunability may be less than 40V. Similar voltage ranges may exist for other materials exhibiting similar ferroelectric properties.

The electric field across the termination plates 1212 may change the termination impedance Td as the field directly changes the dielectric constant (capacitance) of the perovskite mold in the cable. This change may translate to a different termination value similar to a high speed alternate current (AC) termination. The main difference between the AC termination and the described embodiments is that, in contrast tuning the RC combination in an AC termination to match impedance, the effective value of the impedance seen at the SWC input may be altered using the electrically tunable capacitor.

At the receiver side 1220, a similar effect may occur, with the voltage Vr changing the termination impedance. However, this voltage may not be prefixed. Vr may be tuned using a logic, which may be similar to memory tuning or similar to an instance where the overshoot voltage, settling time, bit errors or other parameters may be read, and based on the readings the termination plate voltage Vr may be varied. Vr may be varied until the termination is effective to the point of bringing the best settling times, lowest bit rates or other characteristics.

Figure 13:
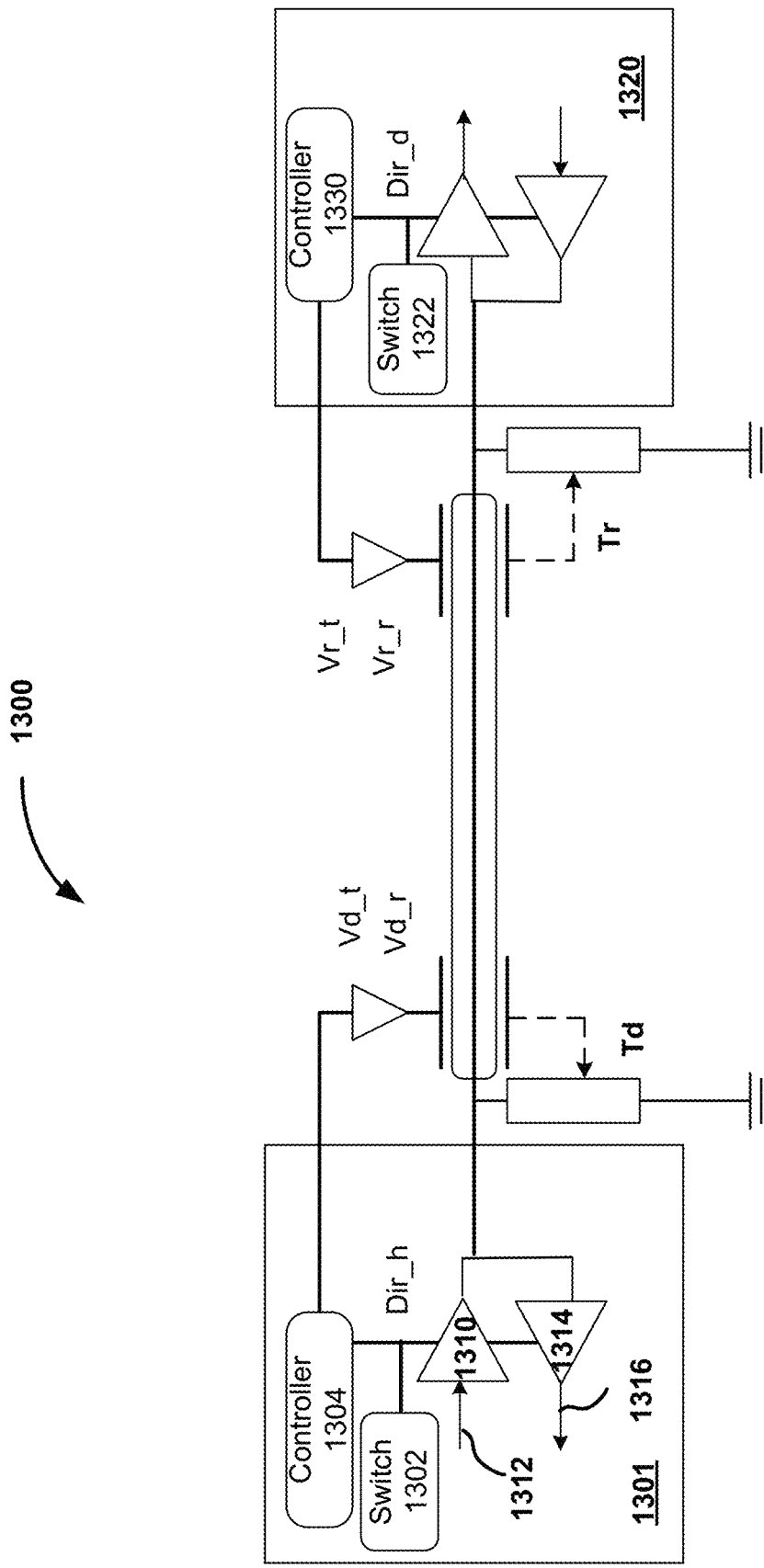
FIG. 13 is an example diagram illustrating an SWC arrangement providing a bidirectional signal transmission, with termination control logic, in accordance with some embodiments.

FIG. 13 is an example diagram illustrating an SWC arrangement providing a bidirectional signal transmission, with termination control logic, in accordance with some embodiments. In the case of a bidirectional arrangement, the controller logic may be enhanced to accommodate different termination voltage values. A bidirectional arrangement 1300 may include a controller 1304 and a switch 1302 at a host side 1301, and a controller 1330 and a switch 1322 at a device side 1320. The arrangement 1300 may include, on the host side 1301, a signal driver 1310 with signal input 1312, and receiver 1314 with output signal 1316.

In the bidirectional arrangement, SWC may include different termination values based on whether the line is transmitting or receiving. To keep power transfer at the maximum during signal transmission, different transmit termination values and receive termination values may be needed. In the bidirectional SWC, the same line may alternate between transmit and receive; in other words, the host, during one cycle of signal transmission, may be the transmitter and in the next cycle may become the receiver. Accordingly, a switchable mechanism may be needed, so that transmit and receive termination values may be alternatingly applied based on the direction of signal transmission.

The switch 1302 may change the direction of signal transmission in the arrangement 1300. The signal that denotes this direction change at the host side 1301 is represented by Dir_h. Depending on this direction signal, controller 1304 at the host side 1301 may drives two different voltages, Vd_t and Vd_r, corresponding to signal transmission and signal reception at the host side 1301 respectively.

During signal transmission, the Vd_t may be applied such that the termination resistance is equivalent to 30 Ohm to 150 Ohm. When the transmission line becomes a receive line, voltage (Vd_r) may be applied, based on previously determined best fit value. As discussed above, voltage values less than 40V may be applied for BaSrTiO2; however, lower and higher voltages may also be used. Accordingly, receiver termination impedance being developed at Td (due to perovskite structure at the cable). Controller 1304 on the receive side may cycle between Vd_t and Vd_r, depending on the direction of the line. A similar arrangement exists at the device side 1320, as shown in FIG. 13.

Figure 14:
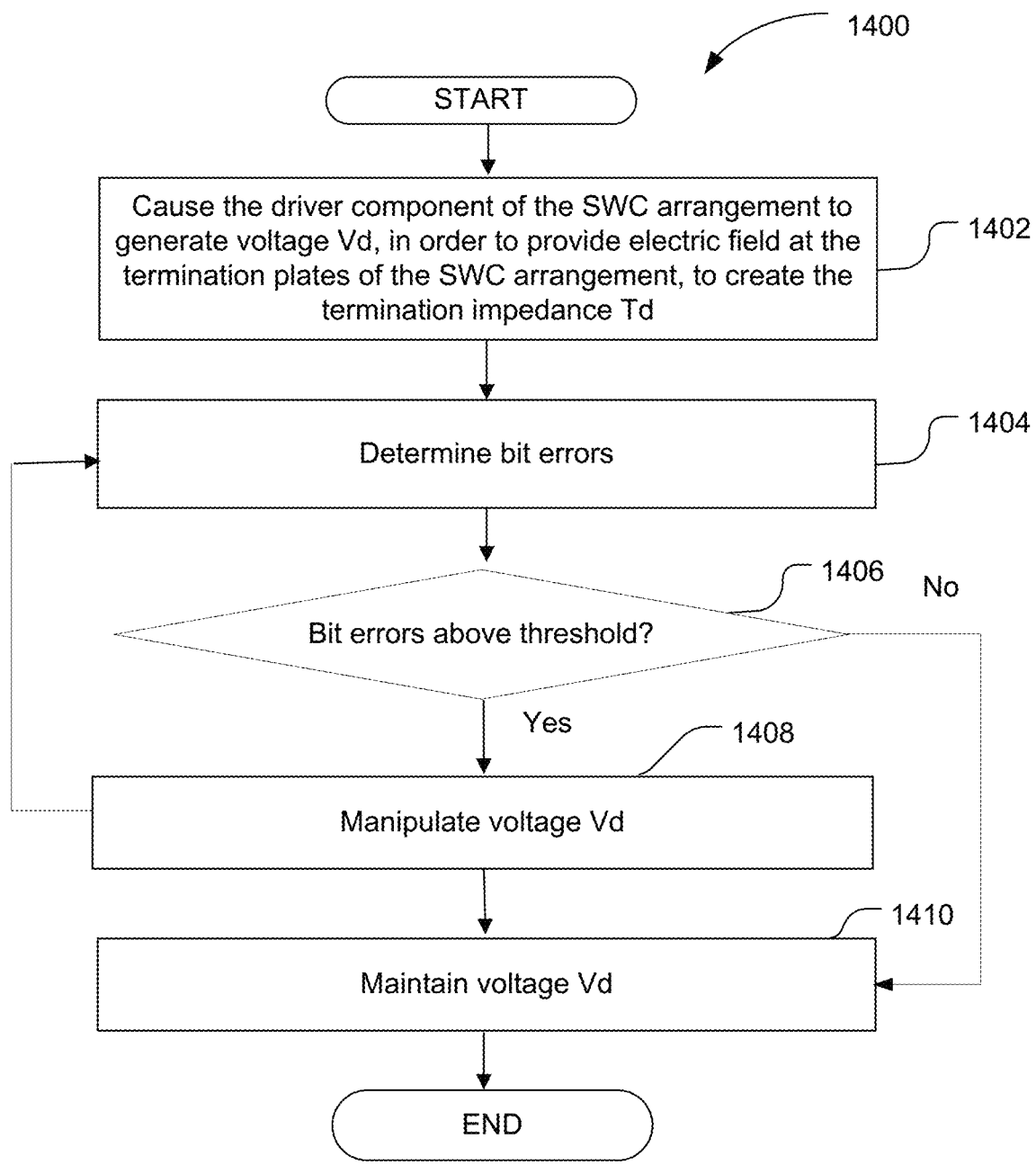
FIG. 14 is an example process flow diagram illustrating an adjustment of a termination value in the SWC arrangement of FIG. 12, in accordance with some embodiments.

FIG. 14 is an example process flow diagram illustrating an adjustment of a termination value in the SWC arrangement of FIG. 12, in accordance with some embodiments. The process 1400 may be performed, for example, by the controller 1208 of FIG. 12.

The process 1400 may begin at block 1402 and include causing the driver component 1210 of the SWC arrangement 1200 to generate voltage Vd, in order to provide electric field at the termination plates 1212 of the SWC arrangement 1200, to create the termination impedance Td.

At block 1404, the process 1400 may include determining bit errors in an SWC data signal at the created termination impedance value Td 1206.

At decision block 1406 it may be determined whether the bit errors are above a determined threshold.

If it is determined that the bit errors are above the threshold, at block 1408 the process 1400 may include manipulating (adjusting voltage Vd value, e.g., incrementally higher or lower than initial voltage value), and the process 1400 may move to block 1404. For example, the Vd value may be increased, and the bit error range determined. If the Vd increase caused the errors to increase, the polarity of bias voltage correction may change and Vd may be incrementally added to. If the Vd increase caused the errors to decrease, the polarity of bias voltage correction may be maintained and Vd may be incrementally added to.

If it is determined that the bit errors are equal or below the threshold, at block 1410 the process 1400 may include maintain the Vd value.

With the termination value adjusted, an SWC signal transmission may commence. The adjustment of the termination value of the SWC arrangement of FIG. 13 may be performed in a similar way.

The following paragraphs describe examples of various embodiments.

Example 1 may be an arrangement to provide single wire communications (SWC) for an electronic device, comprising: a cable assembly to connect with the electronic device, wherein the cable assembly comprises a wire to conduct SWC and a cover portion to cover a portion of the wire, wherein the cover portion comprises a ferro-dielectric material; and a control logic coupled with the cable assembly, to adjust characteristics associated with the ferro-dielectric material, to tune a signal termination impedance value associated with the cable assembly.

Example 2 may include the arrangement of example 1, wherein the control logic is to generate an electric field to interact with the ferro-dielectric material, to adjust the ferro-dielectric material characteristics.

Example 3 may include the arrangement of example 1, wherein the control logic includes a controller to output a control voltage, a driver component coupled with the controller, to generate a potential that corresponds to the control voltage, and termination plates coupled with the driver component, to generate the electric field in response to application of the potential to the plates, wherein the signal termination impedance value is based at least in part on the generated electric field.

Example 4 may include the arrangement of example 1, wherein the characteristics include a capacitance associated with the ferro-dielectric material.

Example 5 may include the arrangement of example 1, wherein signal termination impedance value comprises a range from 30 Ohm to 150 Ohm.

Example 6 may include the arrangement of example 3, wherein the control voltage is within a range from 15 to 40 V.

Example 7 may include the arrangement of example 1, wherein the cover portion is a first cover portion, wherein the wire includes a wire end to couple with a signal launcher of the electronic device, wherein the first wire portion extends from the wire end, wherein the first cover portion comprises a shape to conform to a shape of the signal launcher, and is fabricated of a material with a dielectric constant above a threshold; and wherein the cable assembly further includes a second cover portion coupled with the first cover portion to house a second portion of the wire that extends from the first wire portion and protrudes from the first cover portion, wherein the second cover portion is fabricated of a ferrite material.

Example 8 may include the arrangement of example 7, further comprising a third cover portion disposed between the first and second cover portions, wherein the first, second, and third cover portions are sintered together.

Example 9 may include the arrangement of example 8, wherein the third cover portion comprises a mounting plate to attach the cable assembly to the electronic device.

Example 10 may include the arrangement of example 7, wherein the first cover portion is fabricated by a micro particle injection moulding process, wherein a size of micro particles comprises a range from about 1 um to about 10 um.

Example 11 may include the arrangement of example 1, wherein the electronic device comprises a printed circuit board (PCB), wherein the cable assembly is attached to a side of the PCB.

Example 12 may include the arrangement of example 11, further comprising a magnetic coil attached to the side of the PCB, wherein the control logic is to produce a magnetic field to interact with the ferro-dielectric material, to provide the attachment of the cable assembly to the side of the PCB.

Example 13 may include the arrangement of example 12, wherein the PCB side includes a recess to accommodate the magnetic coil.

Example 14 may include the arrangement of any examples 1 to 13, wherein the ferro-dielectric material comprises a perovskite material.

Example 15 may include the arrangement of example 14, wherein the perovskite material comprises $BaSrTiO_2$.

Example 16 may be a method for signal termination adjustment in a single wire communications (SWC) arrangement, comprising: generating a driver voltage, to provide an electric field to termination plates of a cable assembly of the SWC arrangement; and determining whether a signal transmission parameter associated with the cable assembly is below a desired threshold.

Example 17 may include the method of example 16, further comprising: adjusting the driver voltage, based on a result of the determining whether the signal transmission parameter associated with the cable assembly is below the desired threshold.

Example 18 may include the method of example 16, wherein the cable assembly comprises a wire to conduct SWC and a cover portion to cover a portion of the wire, wherein the cover portion comprises a ferro-dielectric material, wherein generating the driver voltage causes the ferro-dielectric material to change at least one characteristic associated with the material.

Example 19 may include the method of example 18, wherein the at least one characteristic comprises capacitance, wherein a change of the capacitance causes a corresponding change of the signal termination impedance value, wherein the signal transmission parameter comprises a bit error characteristic.

Example 20 may include the method of example 16, further comprising: providing a unidirectional signal transmission via the SWC arrangement.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations

What is claimed is:

1. An arrangement to provide single wire communications (SWC) for an electronic device, comprising:
 a cable assembly to connect with the electronic device, wherein the cable assembly comprises:
  a wire to conduct SWC;
  a first cover portion to cover a portion of the wire, wherein the first cover portion comprises a ferro-dielectric material with a dielectric constant above a threshold, wherein the wire includes a wire end to couple with a signal launcher of the electronic device, wherein the portion of the wire extends from the wire end and includes: a first wire portion; and a second wire portion that extends from the first wire portion, wherein the first cover portion comprises a shape to conform to a shape of the signal launcher; and
  a second cover portion coupled with the first cover portion, to house the second wire portion that extends from the first wire portion and protrudes from the first cover portion, wherein the second cover portion is fabricated of a ferrite material; and
 a control logic coupled with the cable assembly, to adjust characteristics associated with the ferro-dielectric material, to tune a signal termination impedance value associated with the cable assembly.

2. The arrangement of claim 1, wherein the control logic is to generate an electric field to interact with the ferro-dielectric material, to adjust the ferro-dielectric material characteristics.

3. The arrangement of claim 2, wherein the control logic includes a controller to output a control voltage, a driver component coupled with the controller, to generate a potential that corresponds to the control voltage, and termination plates coupled with the driver component, to generate the electric field in response to application of the potential to the plates, wherein the signal termination impedance value is based at least in part on the generated electric field.

4. The arrangement of claim 1, wherein the characteristics include a capacitance associated with the ferro-dielectric material.

5. The arrangement of claim 1, wherein the signal termination impedance value comprises a range from 30 Ohm to 150 Ohm.

6. The arrangement of claim 3, wherein the control voltage is within a range from 15 to 40 V.

7. The arrangement of claim 1, further comprising a third cover portion disposed between the first and second cover portions, wherein the first, second, and third cover portions are sintered together.

8. The arrangement of claim 7, wherein the third cover portion comprises a mounting plate to attach the cable assembly to the electronic device.

9. The arrangement of claim 1, wherein the first cover portion is fabricated by a micro particle injection moulding process, wherein a size of micro particles comprises a range from about 1 um to about 10 um.

10. The arrangement of claim 1, wherein the electronic device comprises a printed circuit board (PCB), wherein the cable assembly is attached to a side of the PCB.

11. The arrangement of claim 10, further comprising a magnetic coil attached to the side of the PCB, wherein the control logic is to produce a magnetic field to interact with the ferro-dielectric material, to provide the attachment of the cable assembly to the side of the PCB.

12. The arrangement of claim 11, wherein the PCB side includes a recess to accommodate the magnetic coil.

13. The arrangement of claim 1, wherein the ferro-dielectric material comprises a perovskite material.

14. The arrangement of claim 13, wherein the perovskite material comprises $BaSrTiO_2$.

* * * * *